(12) United States Patent
Haghighat

(10) Patent No.: US 6,657,510 B2
(45) Date of Patent: Dec. 2, 2003

(54) CORRECTIVE PHASE QUADRATURE MODULATOR SYSTEM AND METHOD

(75) Inventor: Afshin Haghighat, Pierre-fonds (CA)

(73) Assignee: Harris Corporation, Melbourne, FL (US)

( * ) Notice: Subject to any disclaimer, the term of this patent is extended or adjusted under 35 U.S.C. 154(b) by 43 days.

(21) Appl. No.: 09/993,955

(22) Filed: Nov. 27, 2001

(65) Prior Publication Data

US 2003/0098752 A1 May 29, 2003

(51) Int. Cl.[7] .............................................. H03C 3/00
(52) U.S. Cl. ........................................ 332/103; 332/162
(58) Field of Search .............................. 332/103, 104, 332/105, 123, 162; 455/126; 375/298, 235

(56) References Cited

U.S. PATENT DOCUMENTS 4,952,940 A * 8/1990 Kuepfer ..................... 342/174
5,012,208 A * 4/1991 Makinen et al. ............ 332/103
6,208,698 B1 * 3/2001 Marchesani et al. ........ 375/298

* cited by examiner

Primary Examiner—Robert Pascal
Assistant Examiner—Joseph Chang
(74) Attorney, Agent, or Firm—Duane Morris LLP

(57) ABSTRACT

A system and method for producing a phase corrected M-QAM signal is described. In one embodiment, a phase-correcting M-QAM modulator comprises a feedback loop for dynamically adjusting the phase relationship between the two carrier signals as a function of the difference between the phase relationship of the two carrier signals and the phase relationship of the I and Q input signals. In another embodiment where a second carrier signal is derived from the first carrier signal by means of a phase shifting circuit, the amount of phase shift applied to the first carrier signal is a function of the difference between the phase relationship of the two component signals comprising the output QAM signal and the phase relationship between the input I and Q signals.

34 Claims, 10 Drawing Sheets

CORRECTIVE PHASE QUADRATURE MODULATOR SYSTEM AND METHOD

BACKGROUND OF THE INVENTION

The present invention relates to a system and method for producing a quadrature amplitude modulated ("QAM") signal. More particularly, the present invention relates to a system and method for dynamically producing a phase-corrected QAM signal as a function of the difference in the phase relationship between the two component signals of the phase-corrected QAM signal and the phase relationship between the two input signals, typically referred to as the "I" and "Q" signals.

One use for a QAM modulator is in a wireless communication system, although the present inventive system and method is not limited to wireless communication systems. A conventional QAM modulator typically receives an in-phase signal ("I signal"), a quadrature signal ("Q signal"), each of which contain digital data to be communicated to a receiver, and a first carrier signal. The I and Q signals are typically phase shifted 90° each from the other. A first carrier signal is typically used to produce a second carrier signal by means of a phase shifting circuit which shifts the phase of the first carrier signal by 90°. The I signal is used to modulate the first carrier signal to thereby produce a first component signal and the Q signal is used to modulate the second carrier signal to thereby produce a second component signal. The first and second component signals are conventionally added together to produce an output QAM signal which is then transmitted, either over a wireless or wired system, to a receiver.

The output of the QAM modulator is characteristically a constellation of signal points when viewed in the I-Q plane. The minimum distance ("$d_{min}$") between any two points of the signal constellation can be seen as a measure of the susceptibility of the communication system to degradation caused by noise. Noise typically causes the data being received by the receiver to be misinterpreted thereby increasing the bit error rate of the system and resulting in the retransmission of the bits received in error. The higher the bit error rate, the more retransmissions required and the less data throughput realized by the communication system. One way to increase the data throughput is to increase the order of modulation. However, as the order of modulation increases, the more points populate the signal constellation resulting in a smaller $d_{min}$ of the signal constellation and consequently increasing the susceptibility of the communication system to noise.

Ideally, the phase shift between the first and second carrier signals in the modulator is 90° which will result in the maximum $d_{min}$ for a given modulation order and associated signal constellation. In practical systems, however, there is always some phase imbalance, i.e., a phase relationship between the two carrier signals of other than 90°, which results in a smaller $d_{min}$ for the signal constellation.

Typical prior art systems attempt to solve the phase imbalance problem a variety of ways. One prior art system and method is to characterize the phase imbalance for a particular communication system and then statically multiply one of the two carrier signals by a constant amount to compensate for the characterized phase imbalance. The problem with this approach is that the phase imbalance may vary depending on non-constant factors, such as ambient temperature. Additionally, these prior art systems are only effect when the phase imbalance is relatively small. Another prior art system and method may attempt to adjust the level of one or both of the input signals to a QAM modulator as a function of some measured parameter, such as ambient temperature, in an open-loop feedback system. Such open loop control systems may provide some limited degree of control and these systems typically increase the complexity and cost of a QAM modulator by requiring a CPU, memory and attendant circuitry. The degree of control attainable is only as good as the program in the CPU.

Yet another prior art system may employ digital techniques to correct the phase imbalance by using intermediate frequency ("IF") based components. These systems suffer from the added complexity and expense of the added IF components such as CPUs, up-converters, multiple filter stages, etc. Yet other typical prior art systems and methods may additionally attempt to compensate for phase imbalance due to a change in ambient temperature by compensating one or both of the carrier signals by a predetermined amount. These systems require the added complexity and cost of temperature measuring equipment along with the attendant signal processing hardware and software.

One embodiment of the present invention avoids the problems and limitations of the prior art by providing a feedback loop to dynamically control the amount of phase shift applied to the carrier signal as a function of the difference in the phase relationship of the two component signals comprising the output QAM signal and the phase relationship of the I and Q input signals. The inventive system provides dynamic, closed loop control based on the current operating conditions while adding only a few simple, inexpensive components.

Accordingly, it is an object of the present invention to obviate many of the above problems and limitations in the prior art and to provide a novel system and method for generating a phase corrected QAM output signal.

It is another object of the present invention to provide a novel system and method for controlling the amount of phase shift applied to the carrier signal as a function of the difference between the phase relationship of the two component signals comprising the output QAM signal and the phase relationship between the input I and Q signals.

It is yet another object of the present invention to provide a novel system and method of producing an error signal as a function of the relative phase imbalances between the input and output signals in a QAM modulator where the error signal is used to phase correct one of the two carrier signals for the QAM modulator.

It is still another object of the present invention to provide a novel system and method for a phase correcting M-QAM modulator operating in the RF frequency range.

It is a further object of the present invention to provide a novel system and method for producing a phase corrected QAM signal representative of an I and a Q input signal where the I signal modulates a first carrier signal and the Q signal modulates a second carrier signal produced by applying the first carrier signal to one or more phase shifting circuits.

It is yet a further object of the present invention to provide a novel M-QAM modulator comprising a feedback loop for dynamically adjusting the phase relationship between the two carrier signals as a function of the difference between the phase relationship of the two carrier signals and the phase relationship of the I and Q input signals.

It is still a further object of the present invention to provide a novel system and method for producing a QAM signal in a phase correcting QAM modulator where one of the carrier signals is derived by applying the other carrier signal to at least one phase shifting circuit where the amount of phase shift applied is a function of the difference in phase between a first signal representative of the phase relationship of the two component signals comprising the QAM output signal and a second signal representative of the phase relationship of the two input signals to the QAM modulator.

It is an additional object of the present invention to provide a novel system and method for providing closed-loop feedback control for dynamically controlling the amount of phase shift applied to a first carrier signal for producing a second carrier signal where the amount of phase shift applied is a function of the difference between the phase relationship of the two component signals comprising an output QAM signal and the phase relationship between the two input (I and Q) signals.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
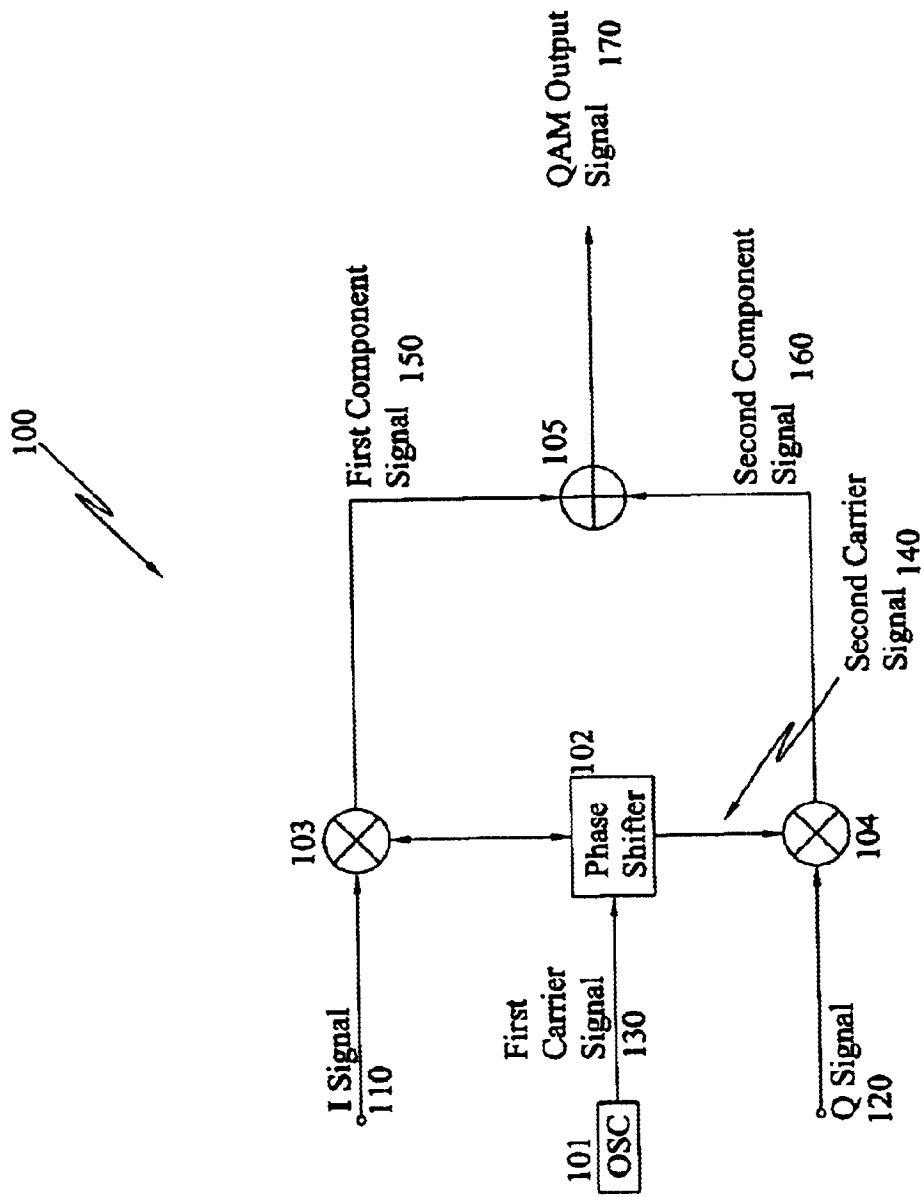
FIG. 1 is a conventional prior art quadrature modulator without phase correction.

With reference to the drawings, like numerals represent like components throughout the several drawings.

As discussed above and shown in FIG. 1, a conventional QAM modulator 100 receives an in-phase signal, or the I signal 110, conventionally expressed as $$I=i(t)$$

and a quadrature signal, or the Q signal 120 conventionally expressed as $$Q=q(t)$$

where i(t) and q(t) may represent information to be transmitted from a transmitter to a receiver in a communication system.

The I and Q signals typically contain digitized data to be transmitted to a receiver over a carrier wave. A first carrier signal 130, which is conventionally generated by an oscillator 101, is applied to a multiplier 103 to be modulated by the I signal 110 to produce the first component signal 150. Any standard means known in the art to generate a carrier signal is contemplated by the present invention The first carrier signal 130 is also applied to a phase shifting circuit 102 which ideally shifts the phase of the first carrier signal by 90° to thereby produce a second carrier signal 140. The second carrier signal is applied to the multiplier 104 to be modulated by the Q signal 120 to produce the second component signal 160. The first and second component signals are combined in the adder 105 to thereby produce the QAM output signal 170.

Figure 2:
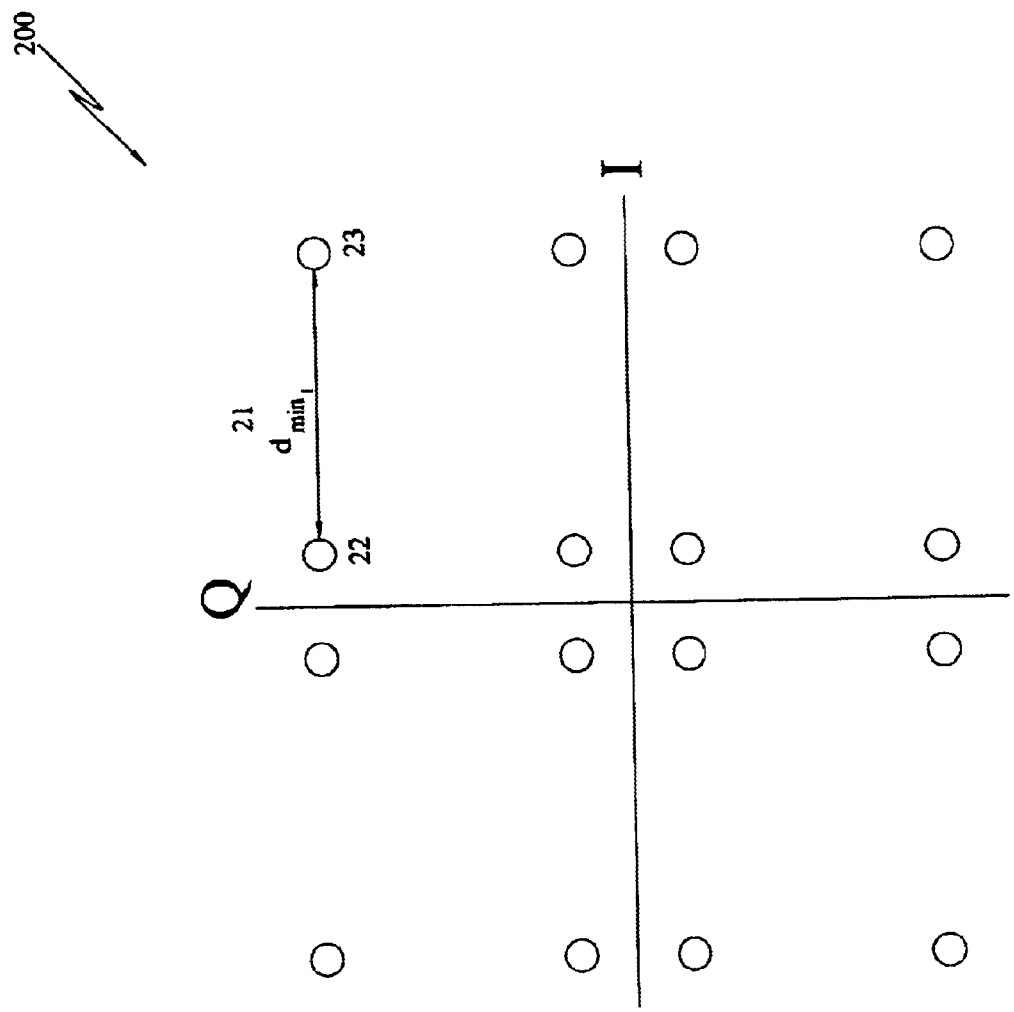
FIG. 2 is a notional graph of a 16 QAM constellation with a 90° phase shift between the I and Q components, depicting a minimum distance between adjacent constellation points.

The QAM output signal, when viewed on the I-Q plane, may be visualized as a signal constellation of points. FIG. 2 is a notional graph of an ideal 16 QAM orthogonal signal constellation 20 in the I-Q plane with a 90° phase shift between the I and Q components. Although a 16 QAM signal constellation is shown, it is to be understood that the present invention is not limited to 16 QAM but rather the present inventive system and method is operational at any order of modulation, i.e., any M-ary signal constellation. As is evident from the conventional expressions of the I and Q signals above, the I axis is the horizontal axis and the Q axis is the vertical axis. The signal constellation points are arranged in a well-defined pattern and the minimum distance 21, $d_{min_1}$ between any two points in the signal constellation can be defined. In FIG. 2, $d_{min_1}$ is defined as the distance between signal constellation points 22 and 23.

Figure 3:
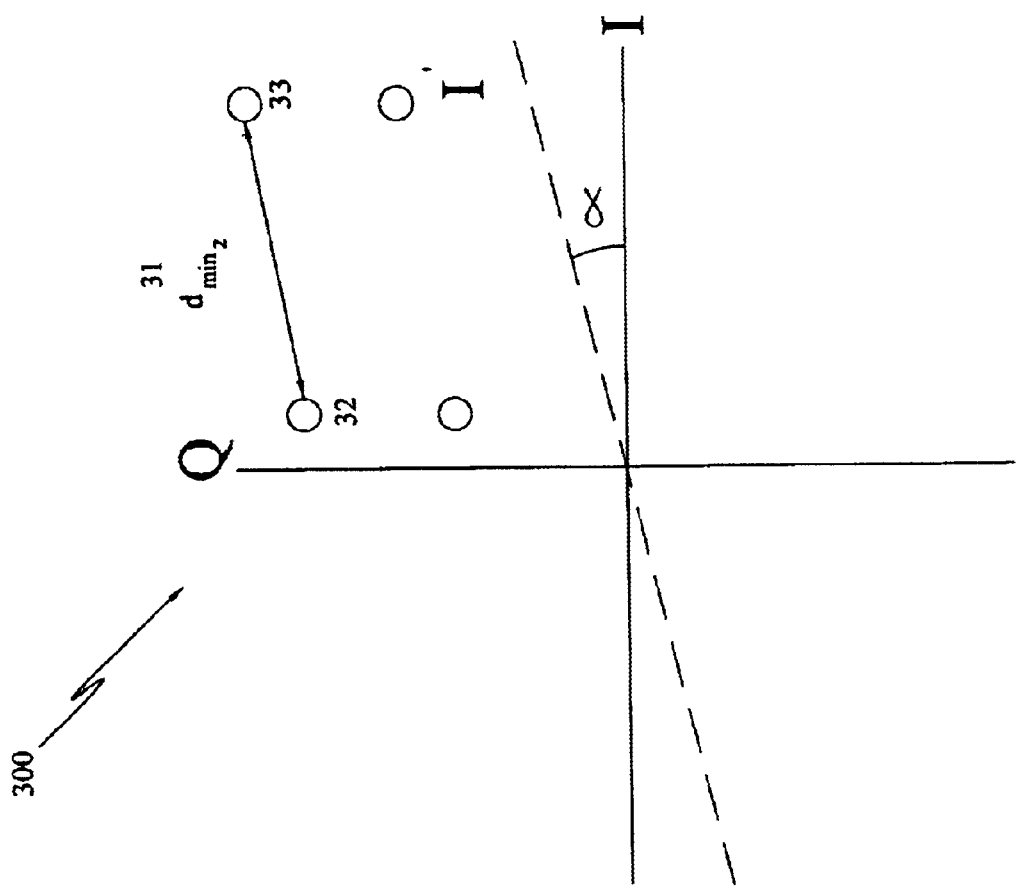
FIG. 3 is a notional graph of a 16 QAM constellation with less than 90° phase shift between the I and Q components, depicting a smaller minimum distance between adjacent constellation points.

A phase imbalance of $\alpha°$ between the I and Q signals, i.e., the I and Q signals are offset from each other by $(90+\alpha)°$ in phase, results in the I and Q axes being offset by $\alpha°$, as shown notionally in FIG. 3. Along with the offset in the I and Q axes is a distortion of the signal constellation 30, shown partially in FIG. 3 for clarity. The minimum distance 31, $d_{min_2}$, between any two points in the signal constellation can be defined. In FIG. 3, $d_{min_2}$ is defined as the distance between signal constellation points 32 and 33. Due to the distortion in the signal constellation caused by the phase imbalance of $\alpha°$, $d_{min_2} < d_{min_1}$.

Figure 4:
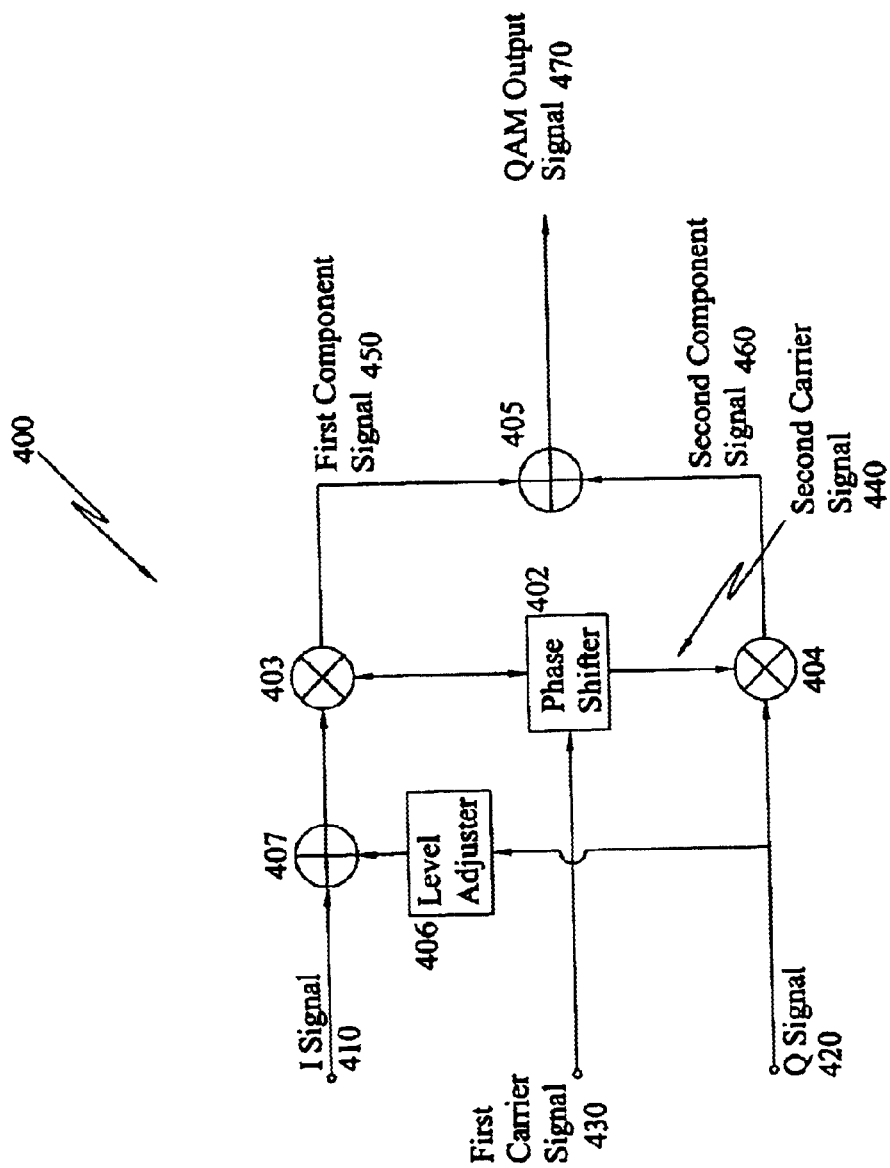
FIG. 4 is a functional block diagram of a prior art quadrature modulator illustrating one method of phase correction.

With attention now to FIG. 4, a functional block diagram depicting a prior art phase-compensating QAM modulator 400 is depicted where similar numerals depict similar components and signals with the respective components and signals of the QAM modulator 100 depicted in FIG. 1. The basic operation of the phase compensating QAM modulator 400 depicted in FIG. 4 is similar to the operation of the QAM modulator 100 depicted in FIG. 1 except as noted below. The prior art phase-compensating modulator 400 includes a level adjuster 406 which multiplies the Q signal 420 by a constant predetermined amount. The constant predetermined amount of adjustment is designed to compensate for a known phase imbalance for a given set of operating conditions. The output of the level adjuster 406 is combined with the I signal in adder 407. The output of the adder 407 is applied to the multiplier 403 in a similar manner as the I signal 110 is applied to the multiplier 103 in FIG. 1. The remaining operation of the phase-compensating QAM modulator 400 in FIG. 4 is similar to the operation of the QAM modulator 100 in FIG. 1. As discussed above, the limitation of the prior art phase-compensating QAM modulator 400 is that the modulator can only compensate for known, constant phase imbalances and cannot react effectively to time-varying imbalances. Therefore, dynamic compensation of the phase imbalance cannot be achieved based on actual operating conditions.

Figure 5:
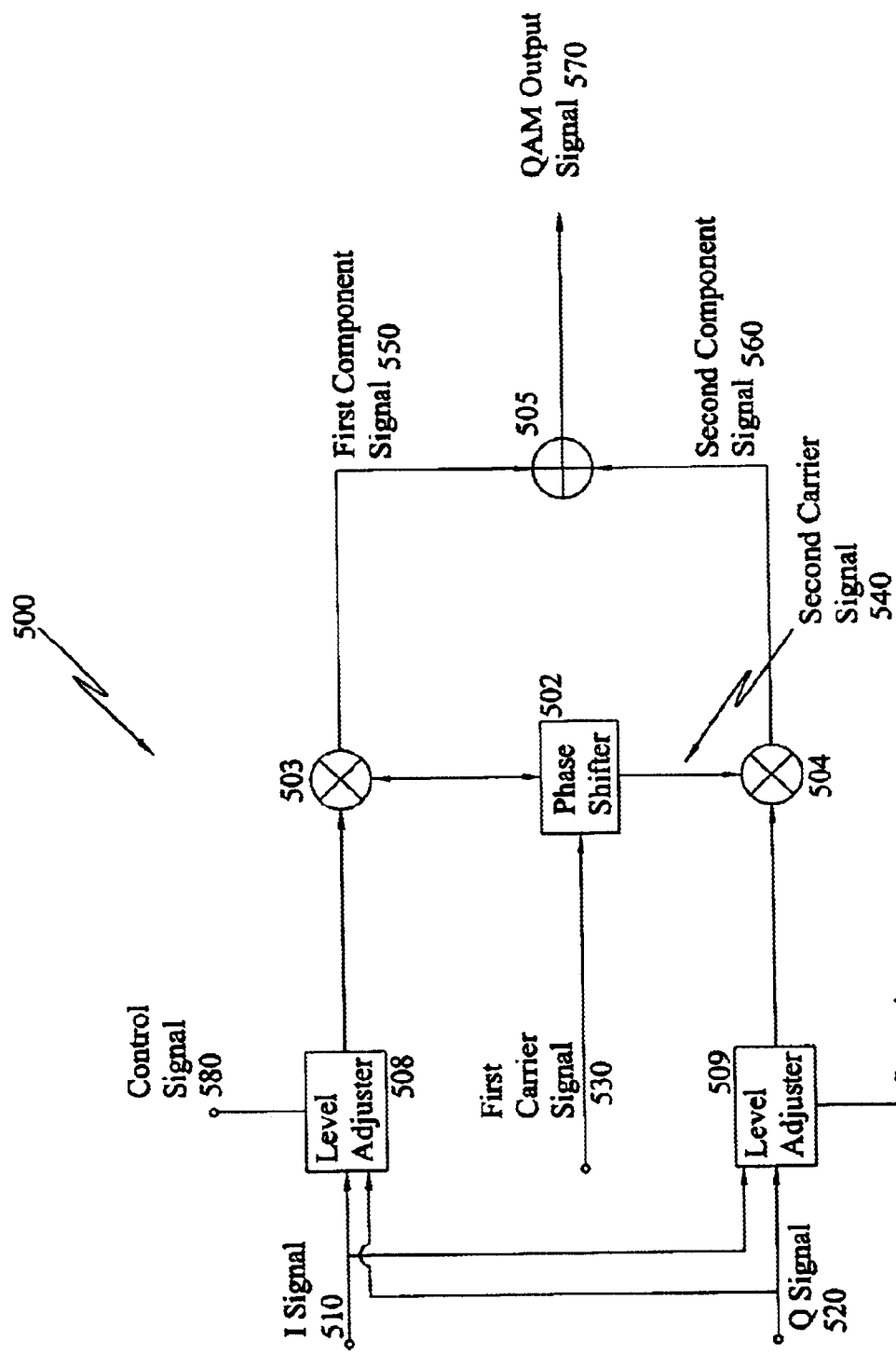
FIG. 5 is a functional block diagram of a prior art quadrature modulator illustrating another method of phase correction.

With attention now to FIG. 5, a functional block diagram depicting a prior art phase-compensating QAM modulator 500 is depicted where similar numerals depict similar components and signals with the respective components and signals of the QAM modulator 100 depicted in FIG. 1. The basic operation of the phase compensating QAM modulator 500 depicted in FIG. 5 is similar to the operation of the QAM modulator 100 depicted in FIG. 1 except as noted below. The I signal 510 and the Q signal 520 are each applied to the level adjusters 508 and 509. The level adjusters may be controlled by control signal 580 and 590, respectively. The output of the level adjuster 508 is applied to the multiplier 503 for modulating the first carrier signal 530 to produce the first component signal 550. Likewise, the output of the level adjuster 509 is applied to the multiplier 504 for modulating the second carrier signal 540 to produce the second component signal 560. The control signals 580 and 590 may be generated from a lookup table or a CPU so as to supply either a constant predetermined level adjustment to the I and Q signals or as a function of an external measurement, such as ambient temperature, in an open-loop control mode. The remaining operation of the phase-compensating QAM modulator 500 in FIG. 5 is similar to the operation of the QAM modulator 100 in FIG. 1.

Figure 6:
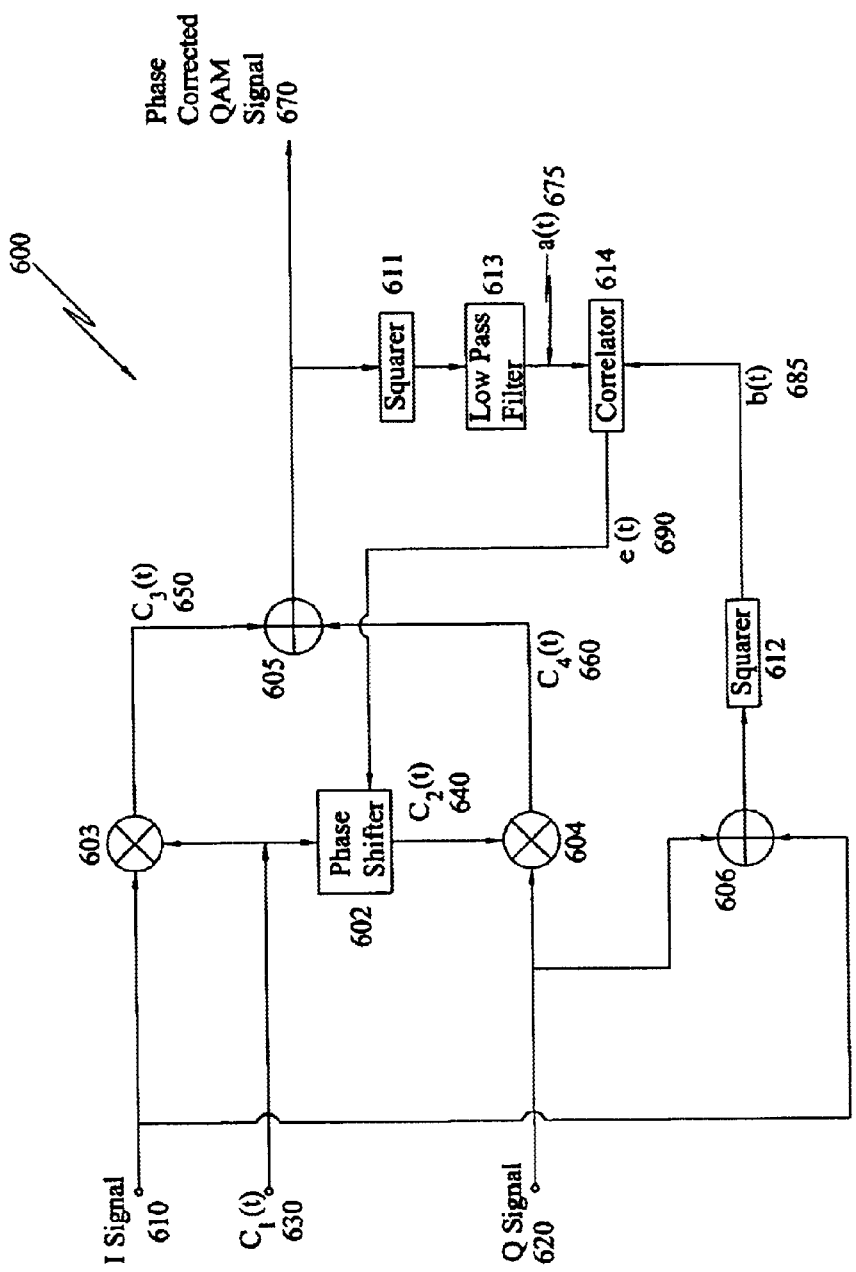
FIG. 6 is a functional block diagram of an embodiment of a quadrature modulator according to the present invention illustrating a feedback loop to control the amount of phase shift applied to the carrier signal in the phase shifter.

Turning attention now to the inventive system and method, one embodiment of the present invention is depicted in the functional block diagram in FIG. 6 where similar numerals depict similar components and signals with the respective components and signals of the QAM modulator 100 depicted in FIG. 1. The basic operation of the phase compensating QAM modulator 600 depicted in FIG. 6 is similar to the operation of the QAM modulator 100 depicted in FIG. 1 except as noted below.

The first carrier signal 630, $c_1(t)$, is applied to the phase shifter circuit 602, which produces the second carrier signal 640, $c_2(t)$, by adjusting the phase of the first carrier signal by an amount controlled by the error signal 690, $e(t)$. The I signal 610 modulates the first carrier signal 630 in multiplier 603 to produce the first component signal 650, $c_3(t)$. Likewise, the Q signal 620 modulates the second carrier signal 640 in multiplier 604 to produce the second component signal 660, $c_4(t)$. The first and second component signals 650 and 660, respectively, are combined in adder 605 to produce the phase-corrected QAM signal 670.

The error signal 690 is representative of the difference between the phase relationship of the first and second component signals 650 and 660, respectively, and the phase relationship of the I and Q signals 610 and 620, respectively. The phase relationship of the first and second component signals may be determined by passing the phase-corrected QAM signal 670 through a squarer circuit 611, the output of which is passed through a low pass filter 613 to strip off the carrier signals and the associated harmonics. The resulting signal $a(t)$, 675, is representative of the phase relationship of the first and second component signals 650 and 660, respectively. The I and Q signals are combined in the adder 606, the output of which is applied to the squarer circuit 612. The output signal 685 of the squarer circuit, $b(t)$, is representative of the phase relationship of the I and Q signals 610 and 620, respectively. The signals $a(t)$ and $b(t)$ are both applied to the correlator 614 which determines the correlation between signals $a(t)$ and $b(t)$. The correlator produces an error signal 690, $e(t)$ that is proportional to the correlation between signals $a(t)$ and $b(t)$, which in turn is proportional to the phase imbalance between the first and second component signals 650 and 660, respectively. The error signal 690, $e(t)$, is fed back to the phase shifter 602 to dynamically correct the phase of the second carrier signal $c_2(t)$ and therefore correct the phase of the second component signal $c_4(t)$ to ensure that the first and second component signals 650 and 660, respectively, maintain a 90° phase orientation from each other based on the actual current phase relationship of the first and second component signals.

The squarer circuit 611 and/or 612 may comprise a schottky diode in a multiplier circuit, although the present invention is not limited to any particular implementation of the squarer circuit.

Figure 7:
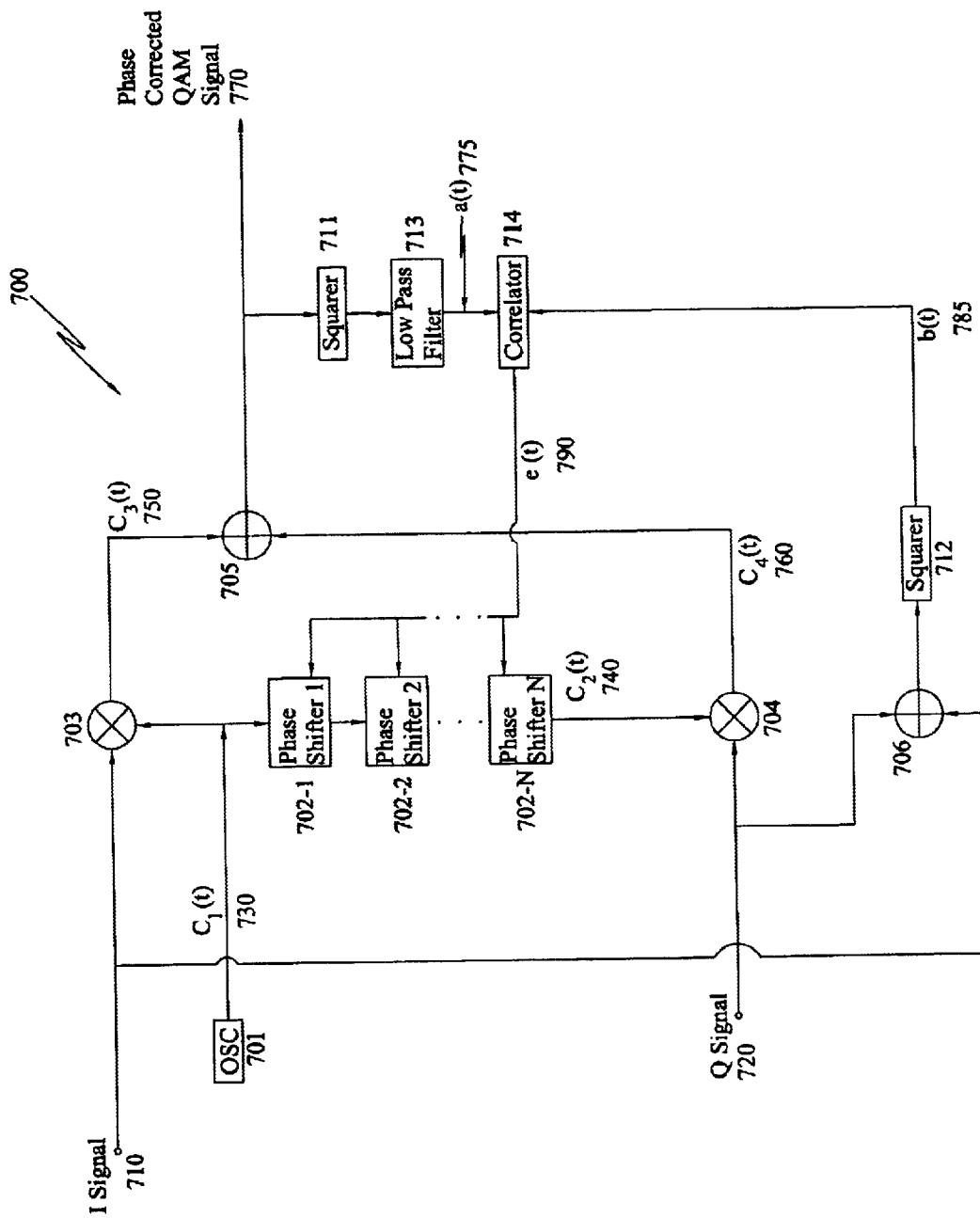
FIG. 7 is a functional block diagram of another embodiment of a quadrature modulator according to the present invention illustrating a plurality of cascaded phase shifters for applying a phase shift to the carrier signal where the phase shifters are controlled by the feedback loop.

With reference directed towards FIG. 7, a second embodiment of the present inventive system and method is depicted in a functional block diagram where similar numerals depict similar components and signals with the respective components and signals of the phase-compensating QAM modulator 600 depicted in FIG. 6. The basic operation of the phase-compensating QAM modulator 700 depicted in FIG. 7 is similar to the operation of the phase compensating QAM modulator 600 depicted in FIG. 6 except as noted below.

As can be seen by a comparison of FIGS. 6 and 7, the phase-compensating QAM modulator 700 differs from the phase-compensating modulator 600 by replacing the phase shifter 602 with a cascaded series of phase shifters 702-1, 702-2, through 702-N. Since each individual phase shifter may operate over a limited range and therefore only be able to compensate for a small variation of phase imbalance, the cascaded approach shown in FIG. 7 will be able to compensate for a larger phase imbalance.

Figure 8:
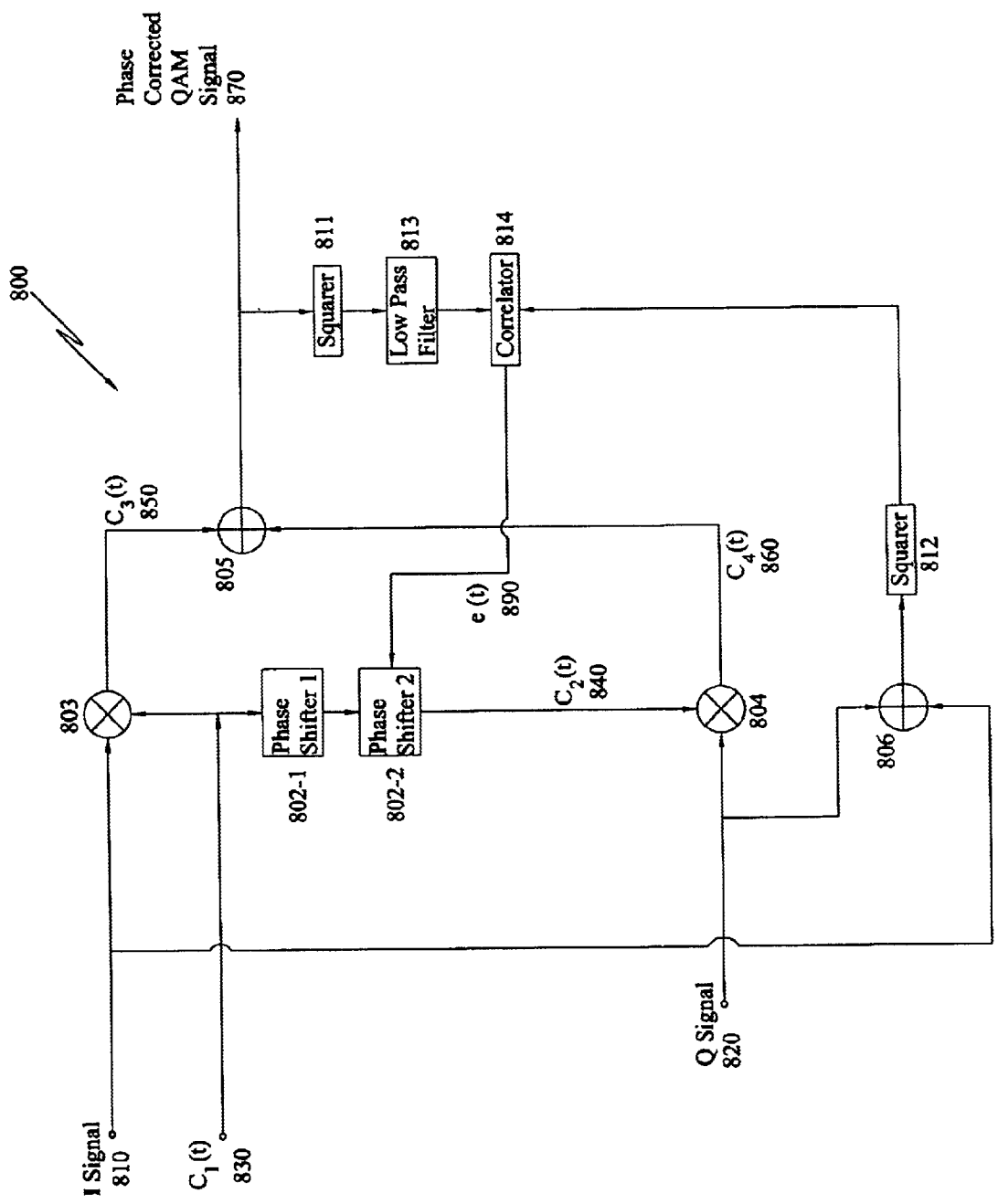
FIG. 8 is a functional block diagram of yet another embodiment of a quadrature modulator according to the present invention illustrating two cascaded phase shifters, one for applying a fixed amount of phase shift to the carrier signal and the other for applying a phase shift to the carrier signal the amount of which is controlled by the feedback loop.

With reference directed towards FIG. 8, a third embodiment of the present inventive system and method id depicted in a functional block diagram where similar numerals depict similar components and signals with the respective components and signals of the phase-compensating QAM modulator 600 depicted in FIG. 6. The basic operation of the phase-compensating QAM modulator 800 depicted in FIG. 8 is similar to the operation of the phase compensating QAM modulator 600 depicted in FIG. 6 except as noted below.

As can be seen by a comparison of FIGS. 6 and 8, the phase-compensating QAM modulator 800 differs from the phase-compensating QAM modulator 600 by replacing the phase shifter 602 with a cascaded series of two phase shifters 802-1 and 802-2. The phase shifter 802-1 applies a fixed amount of phase shift to the first carrier signal 830. The amount of phase shift applied by the phase shifter 802-1 is less than 90°. The phase shifter 802-2 applies an amount of phase shift controlled by the error signal 890, $e(t)$, which is a function of the difference between the phase relationship of the first and second component signals 850 and 860, respectively ($c_3(t)$ and $c_4(t)$, respectively) and the phase relationship of the I and q signals, 810 and 820, respectively, as described above for the operation of the phase-compensating QAM modulator in FIG. 6. The combination of the amount of constant phase shift added to the first carrier signal 630, $c_1(t)$, by the phase shifter 802-1 and the amount of variable phase shift added to the first carrier signal by the phase shifter 802-2 maintains the phase relationship between the first and second component signals, 850 and 860, respectively, at 90°.

Figure 9:
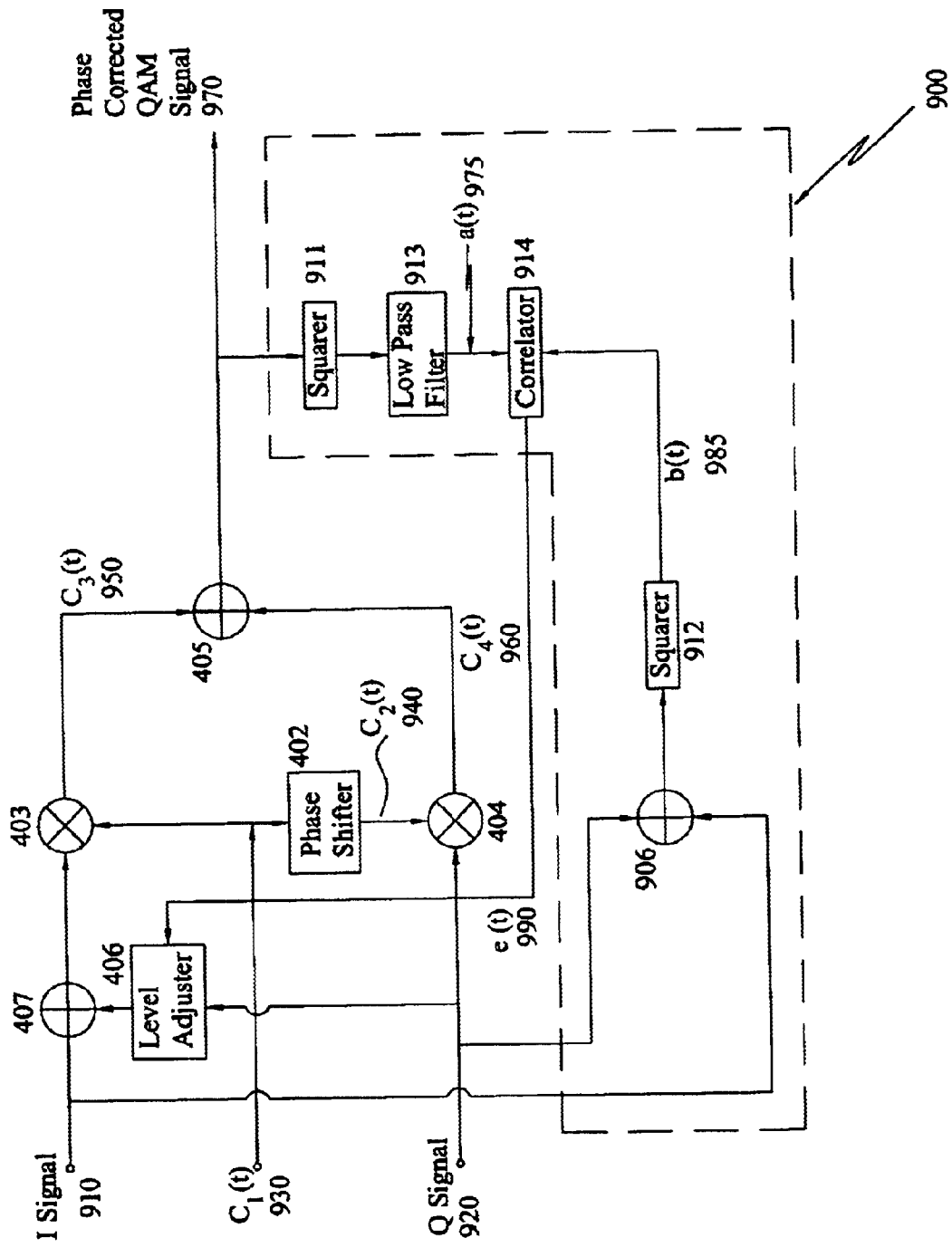
FIG. 9 is a functional block diagram of still another embodiment of a quadrature modulator according to the present invention illustrating a feedback loop to control the amount of level adjustment applied to the I signal.
Figure 10:
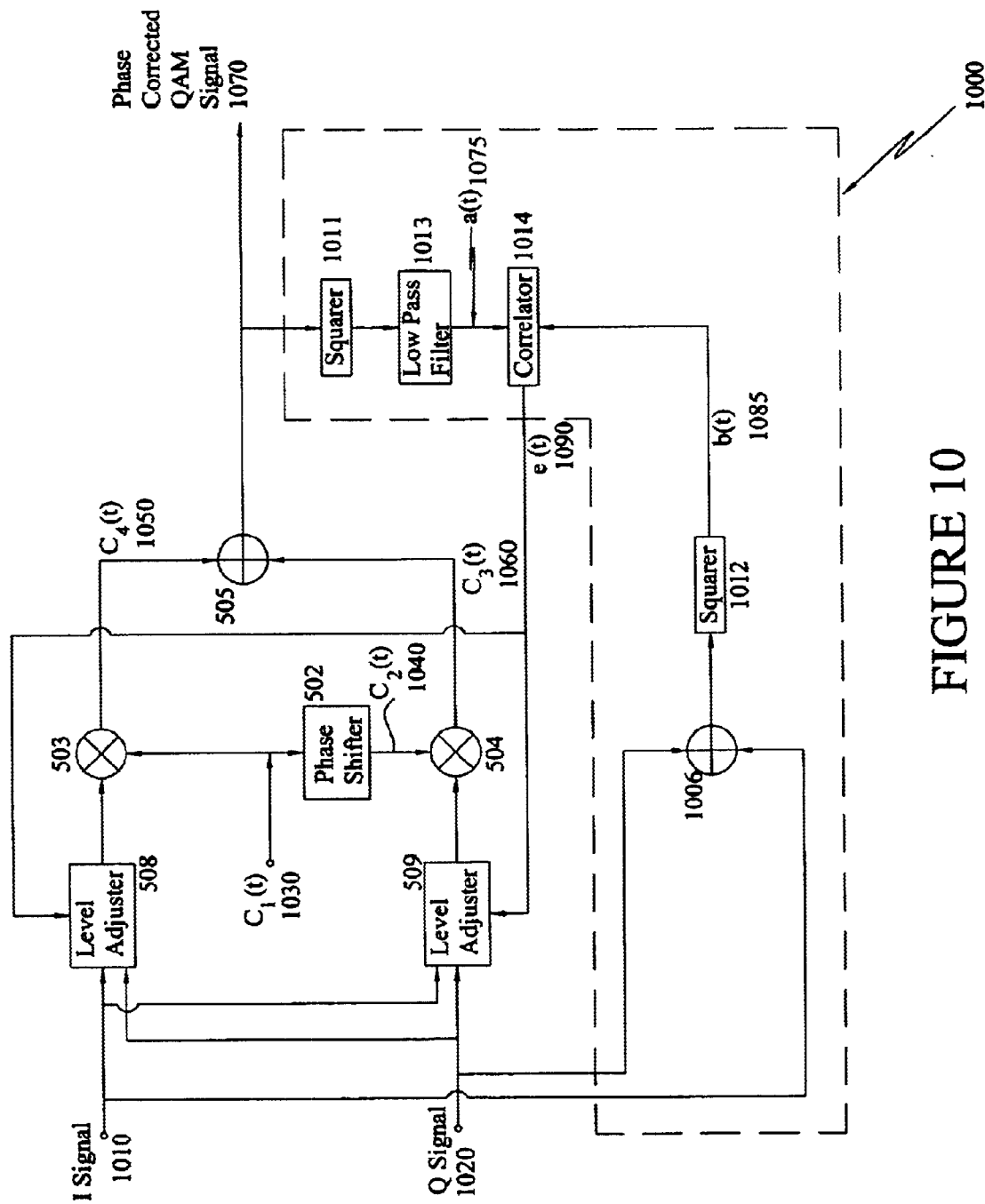
FIG. 10 is a functional block diagram of still yet another embodiment of a quadrature modulator according to the present invention illustrating feedback loops to control the amount of level adjustment applied to the I and Q signals.

Other preferred embodiments of the present inventive system and method are shown in FIG. 9 and FIG. 10 where like numerals represent like components with FIG. 4 and FIG. 5, respectively and similar numerals represent similar signals with FIG. 6. FIG. 9 is a modification of the prior art system shown in FIG. 4. A feedback loop 900 is added to the device in FIG. 4 to dynamically adjust the amount of level adjustment applied to the input Q signal 920. As can be seen in FIG. 9, the feedback loop 900 supplies the error signal 990, e(t), to the level adjuster 406 to thereby dynamically adjust for phase imbalance. As noted above in the discussion of FIG. 4, the device depicted in FIG. 4 includes the level adjuster 406 which multiplies the Q signal 420 by a constant predetermined amount and adds the resultant signal to the I signal 410 to compensate for a known phase imbalance. The device in FIG. 4 is not capable of dynamically adjusting the amount by which the Q signal 420 is modified. The inventive device depicted in FIG. 9 dynamically adjusts the amount by which the Q signal 920 is modified as a function of the actual phase imbalance detected by the feedback loop 900.

Similarly, FIG. 10 is a modification of the prior art system shown in FIG. 5. A feedback loop 1000 is added to the device in FIG. 5 to dynamically adjust the amount of level adjustment applied to the input I and Q signals. As can be seen in FIG. 10, the feedback loop 1000 supplies the error signal 1090, e(t), to the level adjusters 508 and 509 to thereby dynamically adjust for phase imbalance. As noted above in the discussion of FIG. 5, the device depicted in FIG. 5 includes the level adjusters 508 and 509 which each multiply the I and Q signals, 510 and 520, respectively, by a constant predetermined amount to compensate for a known phase imbalance. The device in FIG. 5 is capable of open loop control by measuring an external condition, such as ambient temperature, and sending control signals 580 and 590 to the level adjusters 508 and 509, respectively, to dynamically adjust the amount by which the I and Q signals are modified. However, the device in FIG. 5 is incapable of closed-loop dynamic control of the level adjusters 508 and 509 based on a direct measurement of the phase imbalance. The inventive device depicted in FIG. 10 dynamically adjusts the amount by which the I and Q signals, 1010 and 1020, respectively, are modified in a closed-loop feedback mode by the feedback loop 1000 as a function of the actual phase imbalance detected.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. In a method for generating a quadrature amplitude modulated signal responsive to a first input signal and a second input signal, including the steps of:

producing a first component signal by modulating a first carrier signal with the first input signal;

producing a second component signal by modulating a second carrier signal with the second input signal, where the first carrier signal and the second carrier signal are substantially in quadrature phase relationship; and combining the first component signal and the second component signal to thereby produce a quadrature amplitude modulated signal, the improvement comprising the steps of:

determining the difference between the phase relationship of the first and second component signals and the phase relationship of the first and second input signals; and modifying the quadrature amplitude modulated signal by adjusting the phase of the second carrier signal in response to said difference.

2. The method of claim 1 wherein the step of determining the difference in phase relationships includes the steps of:

producing a first correlation signal representative of the phase relationship of the first and second component signals;

producing a second correlation signal representative of the phase relationship of the first and second input signals;

producing an error signal responsive to the difference between the first and second correlation signals.

3. The method of claim 2 wherein the step of producing the first correlation signal includes the steps of:

squaring the quadrature amplitude modulated signal; and passing the squared quadrature amplitude modulated signal through a low pass filter.

4. The method of claim 2 wherein the step of producing the second correlation signal includes the steps of:

summing the first input signal and the second input signal to thereby produce a summed signal; and squaring the summed signal.

5. The method of claim 2 wherein the step of determining the difference in phase relationships includes comparing the first and second correlation signals in a correlator.

6. The method of claim 5 wherein the first carrier signal and the second carrier signal are radio frequency signals.

7. The method of claim 2 wherein the first carrier signal is produced by an oscillator and the second carrier signal is produced by applying the first carrier signal to a phase shifting circuit so as to shift the phase of the first carrier signal by a predetermined amount.

8. The method of claim 7 wherein the predetermined amount is approximately 90° C.

9. The method of claim 8 wherein the step of modifying the quadrature amplitude modulated signal includes applying the error signal to the phase shifting circuit so as to adjust the amount of the phase shift applied to the first carrier signal in the production of the second carrier signal as a function of the magnitude of the error signal.

10. The method of claim 9 wherein the first carrier signal and the second carrier signal are radio frequency signals.

11. The method of claim 9 wherein the quadrature amplitude modulated signal is an M-QAM signal.

12. A phase corrected quadrature amplitude modulator comprising:

first circuit means for producing a first carrier signal;

second circuit means for producing a second carrier signal shifted in phase approximately 90° from said first carrier signal;

first combining means for modulating said first carrier signal with a first input signal to thereby produce a first component signal;

second combining means for modulating said second carrier signal with a second input signal to thereby produce a second component signal;

first summing means for combining said first component signal and said second component signal to thereby produce a quadrature amplitude modulated signal;

second summing means for combining said first input signal and said second input signal to thereby produce a combined signal; and error producing means foil producing an error signal responsive to the difference between the phase relationship of the first and second component signals and the phase relationship of the first and second input signals, whereby said error signal is applied to said second circuit means so as to maintain a quadrature phase relationship between said first carrier signal and said second carrier signal.

13. The modulator of claim 12 wherein said first carrier signal and said second carrier signal are radio frequency signals.

14. The modulator of claim 12 wherein the first input signal and the second input signal include digitized data.

15. The modulator of claim 12 wherein the quadrature amplitude modulated signal is an M-QAM signal.

16. The modulator of claim 12 wherein said first circuit means is an oscillator.

17. The modulator of claim 12 wherein said second circuit means is a phase shifting circuit adapted to receive said first carrier signal and capable of producing said second carrier signal from said first carrier signal.

18. The modulator of claim 17 wherein said phase shifting circuit includes a plurality of phase shifting circuits arranged in a cascaded series.

19. The modulator of claim 12 wherein the first summing means includes:

a first summing circuit for combining said first and second component signals to thereby produce said quadrature amplitude modulated signal;

a first squarer circuit for producing a squared signal proportional to the square of said quadrature amplitude modulated signal; and a low pass filter for filtering out the components of said squared signal that are at a frequency higher than a predetermined frequency to thereby produce a first correlation signal.

20. The modulator of claim 19 wherein the value of said predetermined frequency is such that said first and second carrier signals and all harmonics related thereto are filtered out.

21. The modulator of claim 19 wherein the second summing means includes:

a second summing circuit for combining said first and second input signals to thereby produce a combined signal; and a second squarer circuit to thereby produce a second correlation signal proportional to the square of said combined signal.

22. The modulator of claim 21 wherein said error producing means includes a correlator for comparing the phase difference between the phase relationship of the first and second component signals and the phase relationship of the first and second input signals to thereby produce said error signal for applying to said second circuit means to maintain the quadrature phase relationship between said first carrier signal and said second carrier signal.

23. In a modulator for producing a quadrature amplitude modulated signal representative of a first input signal and a second input signal where a first carrier signal is modulated by the first input signal to thereby produce a first component signal and a second carrier signal is modulated by the second input signal to thereby produce a second component signal, and where said first and second carrier signals are substantially in a quadrature phase relationship, the improvement comprising a feedback loop for dynamically adjusting the phase relationship between said first and second carrier signals as a function of the difference between the phase relationship of the first and second component signals and the phase relationship of the first and second input signals.

24. The modulator of claim 23 wherein said first carrier signal and said second carrier signal are radio frequency signals.

25. The modulator of claim 23 wherein the first input signal and the second input signal include digitized data.

26. The modulator of claim 23 wherein the quadrature amplitude modulated output signal is an M-QAM signal.

27. A method for producing a quadrature amplitude modulated signal comprising the steps of:

providing a first and a second input signal producing a first and a second carrier signals substantially in a quadrature phase relationship with each other;

modulating the first carrier signal with the first input signal to thereby produce a first component signal;

modulating the second carrier signal with the second input signal to thereby produce a second component signal;

combining the first and the second component signals;

providing a feedback loop to dynamically adjust the phase relationship between the first and the second carrier signals so as to maintain the first and the second carrier signals in a substantially quadrature phase relationship;

wherein the step of providing a feedback loop includes the step of determining the difference between the phase relationship of the first and second component signals and the phase relationship of the first and second input signals: and, wherein the step of determining the difference in phase relationships includes the steps of:

producing a first correlation signal representative of the phase relationship of the first and second component signals;

producing a second correlation signal representative of the phase relationship of the first and second input signals;

producing an error signal responsive to the difference between the first and second correlation signals.

28. The method of claim 27 wherein the step of producing the first and the second carrier signals includes the steps of:

producing the first carrier signal by an oscillator; and producing the second carrier signal by applying the first carrier signal to a phase shifting circuit so as to shift the phase of the first carrier signal by approximately 90°.

29. The method of claim 28 wherein the error signal is applied to the phase shifting circuit so as to adjust the amount of the phase shift applied to the first carrier signal in the production of the second carrier signal as a function of the magnitude of the error signal.

30. The method of claim 29, wherein the first carrier signal and the second carrier signal are radio frequency signals.

31. The method of claim 29, wherein the quadrature amplitude modulated signal is an M-QAM signal.

32. In a method for generating a phase-compensated quadrature amplitude modulated signal responsive to a first input signal and a second input signal, including the steps of:

producing a first component signal by modulating a first carrier signal with the C first input signal;

producing a second component signal by modulating a second carrier signal with the second input signal, where the first carrier signal and the second carrier signal are substantially in quadrature phase relationship; and combining the first component signal and the second component signal to thereby produce a quadrature amplitude modulated signal, the improvement comprising the step of:
dynamically adjusting the phase of the second carrier signal via closed-loop feedback control as a function of the difference between the phase relationship of the first and second component signals and the phase relationship of the first and second input signals.

33. In a method for generating a phase-compensated quadrature amplitude modulated signal responsive to a first input signal and a second input signal, including the steps of:

producing a first component signal by modulating a first carrier signal with the first input signal;

producing a second component signal by modulating a second carrier signal with the second input signal, where the first carrier signal and the second carrier signal are substantially in quadrature phase relationship; and combining the first component signal and the second component signal to thereby produce a quadrature amplitude modulated signal, the improvement comprising the step of:
dynamically adjusting the level of one of the two input signals as a function of the difference between the phase relationship of the first and second component signals and the phase relationship of the first and second input signals.

34. In a method for generating a phase-compensated quadrature amplitude modulated signal responsive to a first input signal and a second input signal, including the steps of:

producing a first component signal by modulating a first carrier signal with the first input signal;

producing a second component signal by modulating a second carrier signal with the second input signal, where the first carrier signal and the second carrier signal are substantially in quadrature phase relationship; and combining the first component signal and the second component signal to thereby produce a quadrature amplitude modulated signal, the improvement comprising the step of:
dynamically adjusting the level of each of the two input signals via closed loop feedback control as a function of the difference between the phase relationship of the first and second component signals and the phase relationship of the first and second input signals.

* * * * *